United States Patent [19]

De Bennetot

[11] 3,749,098
[45] July 31, 1973

[54] APPARATUS FOR INTRACORPOREAL CONTROL, IN PARTICULAR OF THE CROSS-SECTION OF AN ORGANIC VESSEL OR DUCT

[75] Inventor: Michel Cotton De Bennetot, Brest, France

[73] Assignee: Agence Nationale de Valorisation de la Recherche, Paris, France

[22] Filed: Apr. 7, 1971

[21] Appl. No.: 132,083

[30] Foreign Application Priority Data
Apr. 7, 1970  France .............................. 7012618

[52] U.S. Cl. ........................ 128/346, 251/8, 251/65
[51] Int. Cl. . A61b 17/08, A61b 17/12, F16k 31/08
[58] Field of Search ................... 128/346; 251/8, 65

[56] References Cited
UNITED STATES PATENTS
2,455,859   12/1948   Foley .................................. 128/346
2,533,924   12/1950   Foley .................................. 128/346

Primary Examiner—Channing L. Pace
Attorney—John W. Malley et al.

[57] ABSTRACT

An apparatus for causing a semi-permanent constriction of an intracorporeal duct comprises a synchronous magnetic coupling having driving and driven rotors and in accordance with the invention, a flexible transmission connecting the output shaft of the driven rotor to an intracorporeal valve provided with flaps which control the cross-section of the duct.

A feature of the invention is that the extracorporeal housing of the driving rotor and the intracorporeal housing of the driven rotor are adapted for interlocking while leaving a clearance therebetween for insertion of a skin projection.

5 Claims, 5 Drawing Figures

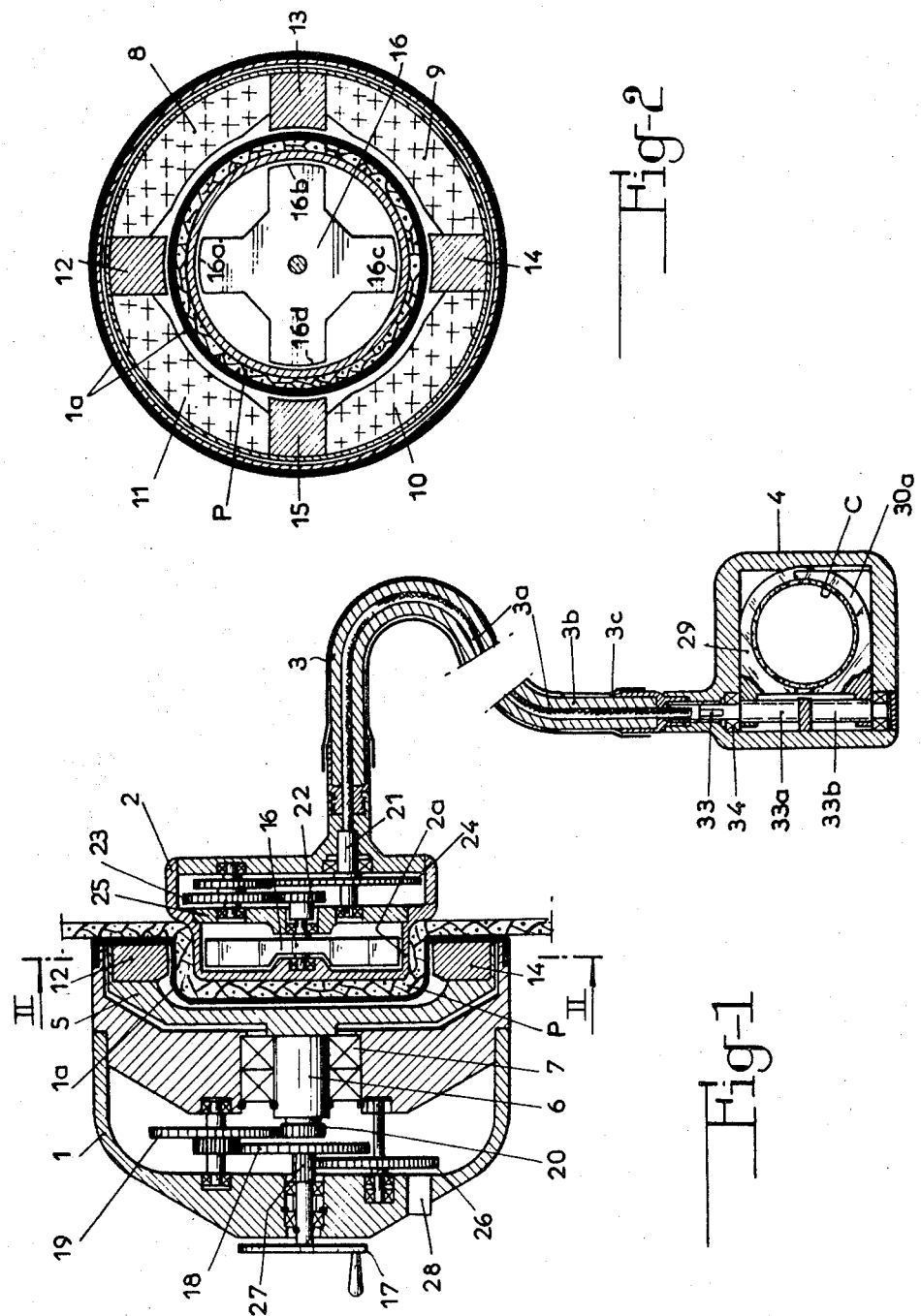

APPARATUS FOR INTRACORPOREAL CONTROL, IN PARTICULAR OF THE CROSS-SECTION OF AN ORGANIC VESSEL OR DUCT

The present invention relates to an apparatus for controlling, from the outside of the body of a human or animal, an intracorporeal organ and, more particularly, for causing a semi-permanent constriction of a natural or artifical duct or vessel, such as a blood vessel, an artificial anus, or the like.

The principal object of this invention is to provide a control device of the character described, which does not include any parts or connection across the body wall.

It is another object of the invention to provide a control device which will be readily tolerated by the patient for an indefinite period of time.

A further feature of the invention resides in the provision of an apparatus comprising, in combination : a synchronous magnetic coupling having driving and driven rotors respectively contained in extracorporeal and intracorporeal casings, the said casings having opposite surfaces portions which are adapted for interlocking while leaving a clearance therebetween wherein a substantially cylindrical skin projection is lodged, the two rotors being concentrically arranged on the respective sides of the said skin projection; control means for the vessel or duct and flexible transmission means connecting said control means to an output shaft which is in turn integrally connected with the driven rotor.

According to a further feature of the invention, the said control means comprises a valve having flaps which bring about the constriction of the duct.

According to yet a further feature of the invention the driving rotor in turn is rotated by means of motor means, the shaft of which drives a toothed wheel bearing a graduated scale which indicates the amount of constriction of the duct obtained for each of the angular positions of the said shaft.

Other and additional objects will be seen as the description of this specification proceeds.

Referring to the drawings:

FIG. 1 is a vertical section of an apparatus for intracorporeal control of an organ, said apparatus being designed in accordance with a preferred embodiment of the invention;

FIG. 2 is a section on the line II—II of FIG. 1.

Referring more particularly to FIG. 1, there is shown, in vertical section, a device for controlling the section of passage of an organic vessel or duct within the body of a human or an animal.

Figure 3:
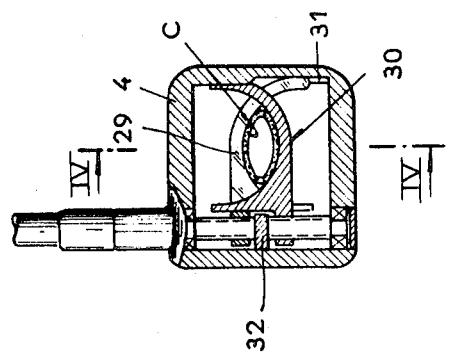
FIG. 3 shows a valve, in its closed position.
Figure 4:
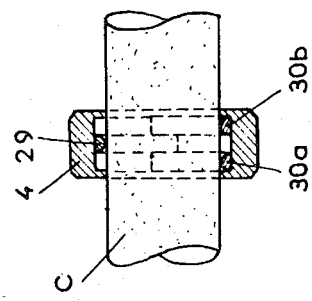
FIG. 4 shows the said valve, in its open position, in section on the line IV—IV of FIG. 3 and, FIG. 5 shows the valve in its closed position, in section on the line IV—IV of FIG. 3.
Figure 5:
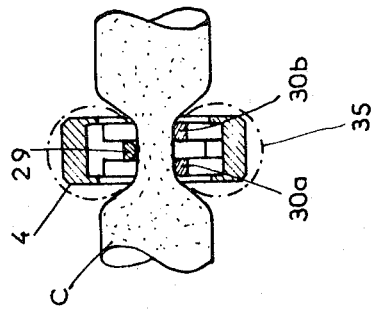

Such a device will be for instance used for controlling an anastomosis between the portal vein and the vena cava. It essentially consists of an extracorporeal head and an intracorporeal system. The extracorporeal head comprises, housed in a casing 1, motion control and transmission means and the driving rotor of a synchronous magnetic coupling. The intracorporeal system comprises, on one hand, housed in a casing 2, the driven rotor of the magnetic coupling and motion transmission means and, on the other hand, a flexible transmission 3 and a valve 4 adapted for bringing about an adjustable constriction of the cross-section of the duct C as illustrated in FIGS. 3–5. According to an important feature of this invention, the casing 2 has a substantially cylindrical part 2a which interlocks with a surrounding concentric annular part 1a of the casing 1. The mating parts 1a and 2a are arranged for leaving a clearance therebetween, in which the skin wall P is inserted with a slight deformation; such a skin projection will be easily obtained by the surgeon.

The magnetic coupling is so designed that the attraction forces existing between the sets of teeth of the two rotors are arranged in a plane at right angles to the axis of revolution of the device and have a radial resultant which is constantly nil. It results that there is no risk of bruising of the skin under the action of the magnetic attraction forces.

In the specific embodiment disclosed, the driving rotor includes a member 5 made of a non magnetic material, extended by a shaft 6 in turn supported by a bearing 7. The driving rotor includes for instance four permanent magnets 8–11 having pole pieces 12–15 (FIG. 2) which cooperate with the teeth 16a to 16d of a driven rotor 16 made of a permeable magnetic material, for instance mild steel, so as to delimit active airgaps therebetween.

The shaft 6 will be driven by means of a crank 17, through a multiplier gearing 18–19–20 having for instance a ratio equal to ten. The driven rotor 16 in turn rotates an output shaft 21, through a reducer gearing 22–23–24. Member 25 is stationary and has the function of supporting the bearings for toothed wheels 22, 23 and 24.

The function of the multiplier gearing is to reduce the number of revolutions of crank 17 which are necessary for rotating the driving rotor 5. The reducer gearing reduces the rotation speed of the output shaft 21 to sufficiently low a value to obtain a satisfactory operation of the flexible transmission and of the valve. The reducer gearing further avoids too sharp a squeezing of the organic vessel and also reduces the torque to be transmitted by the magnetic coupling, for a given force to be obtained from the valve.

According to a specific feature of the invention, the toothed wheel 26, driven by a pinion 27 mounted on the shaft of the crank 17, bears on one face thereof, a graduated scale which can be seen through an aperture 28 provided in the front wall of casing 1. This scale for instance is graduated from 0 to 100, the 0 reference mark corresponding to the position of maximum opening of the valve (FIGS. 1 and 4), whereas the reference mark 100 corresponds to the position of maximum closure. These two extreme positions are defined by means of stop members comprised in the valve, as will be disclosed hereinafter. This arrangement allows for an accurate determination of each of the intermediate operating positions of the valve.

The valve comprises two flaps 29 and 30a–30b adapted for parallel displacement. In their position of maximum separation (i.e., when the stop member abuts against the walls of casing 4), the two flaps together delimit a cylindrical space. As shown in FIG. 4, the lowerlap forms two branches of a claw 30a, 30b, symmetrically arranged with respect to the single clamping branch which is formed by the higher flap 29. The displacement of the flaps is guided by grooves 31 provided in the inner wall of casing 4 and is bounded by a stop member 32.

The said displacement is controlled as follows :

The flexible link 3 has an inner flexible member 3a rotatable within a sheath 3b, in turn surrounded by a sleeve 3c made of a material compatible with the organism. This inner member is integrally connected to a screw 33 the head of which is rotatably mounted in a bearing 34. The body of screw 33 is provided with a thread 33a on its upper half and with a further thread 33a on its upper half and with a further thread 33b on its lower half. These two threads are reversely handed and, therefore, rotation of the screw will bring about respective translation in reverse directions of the flaps 29 and 30a, 30b, respectively. It is to be emphasized that the screw 33 which controls the displacement of the flaps of the valve is not mounted for rotation in both directions. This avoids the necessity of leaving the extracorporeal part of the magnetic coupling in position on the skin once the degree of opening of the valve has been adjusted as desired.

Referring more particularly to FIG. 5, numeral 35 indicates a protective textile number interposed between vessel C and the flaps, so as to avoid direct engagement of the latter with the vessel.

The operation of the apparatus is as follows:

The intracorporeal system is first positioned within the organism according to well known techniques and the extracorporeal head is then fitted on the skin projection P. The crank is rotated until the reference mark which defines the desired constriction of the vessel is reached. The degree of constriction is read on a graduated scale on wheel 26.

For opening the vessel, the crank is rotated in the reverse direction.

It is to be emphasized that, once put in service, the magnetic coupling has nil power consumption. Power is to be provided from an external source only during the opening and closing steps. It is to be understood that the said power will not be necessarily provided through manual action on the crank : the latter may be substituted by small electric motor.

While in operation, the apparatus does not include any connection or tubing across the skin.

The application disclosed as an example is by no ways limiting. The apparatus is adapted for providing the semi-permanent constriction or even the semi-permanent complete closure of any natural or artificial duct within the organism (for instance, an artificial anus). It may also be adapted for effecting other controls: the rotative motion which is available on the output shaft 21 might be for instance converted into a translation. In the latter case, the flexible transmission will be adapted and driven for effecting a translation motion: the intracorporeal control mechanism which is connected at the end thereof should of course, in this case, be of a type different from the valve disclosed hereinabove.

Other modifications may be brought to the apparatus. For instance, the permanent magnet driving rotor of the magnetic coupling could be substituted by a stationary device adapted for generating a rotating field obtained by means of coils and means for causing properly phased currents to flow through the respective coils. The type of coupling which is adapted for use in this invention will be generally termed "a rotating magnetic field transmission system."

I claim: 8

1. An apparatus for controlling an intracorporeal organ, from the outside of the body of a human or animal, said apparatus comprising: a rotating magnetic field transmission system including driving and driven members, said driven member having an output shaft; an extracorporeal casing containing said driving member; an intracorporeal casing containing said driven member; intracorporeal control means for controlling the intracorporeal organ; and flexible transmission means connecting the output shaft of the driven member to the control means, the said casings having opposite surface portions which are adapted for interlocking while leaving a clearance therebetween adapted to receive a substantially cylindrical skin projection therein.

2. An apparatus for controlling, from the outside of the body of a human or animal, the cross-section of a natural or artificial duct within the body, said apparatus comprising: a synchronous magnetic coupling having driving and driven rotors, the driven rotor having an output shaft; an extracorporeal casing for the driving rotor and an intracorporeal casing for the driven rotor; motor means, operatively connected to the driving rotor, for causing an adjustable rotation thereof; intracorporeal valve means adapted to bring about the constriction of the duct; and flexible transmission means connecting the output shaft to the valve means, the two rotors having concentric cylindrical facing surface portions, the intracorporeal casing having a substantially cylindrical concentric surface portion in which the driven rotor is lodged, the extracorporeal casing having a further substantially cylindrical concentric surface portion in which the driving rotor is lodged, the said further surface portion having a substantially annular projection which is adapted for being concentrically arranged about the said substantially cylindrical portion and radially spaced therefrom, whereby a clearance is provided for lodging a substantially cylindrical skin projection located between the said concentric cylindrical surface portions of the two rotors when placed in operative relation with the body.

3. An apparatus as claimed in claim 2, wherein the said motor means have a rotatable shaft, a wheel, operatively connected to said shaft so as to be rotated thereby, bearing a graduated scale.

4. An apparatus as claimed in claim 2, wherein the said valve has two flaps mounted for parallel mutual displacements and forming a clamping means for the duct, a screw, provided with left-handed and right-handed threads, being rotatably mounted and operatively connected to the flexible transmission means.

5. An apparatus as claimed in claim 2, further comprising speed multiplier means connecting the motor means to the driving rotor and speed reducer means connecting the driven rotor to the output shaft.

* * * * *